(12) United States Patent
Zeng et al.

(10) Patent No.: US 12,374,986 B1
(45) Date of Patent: Jul. 29, 2025

(54) CARRIER RECONSTRUCTION METHOD FOR ELIMINATING DC AND LOW-FREQUENCY CIRCULATING CURRENTS IN MULTI-PARALLEL CONVERTERS

(71) Applicant: Nanjing University of Science and Technology, Nan Jing (CN)

(72) Inventors: Zhiyong Zeng, Nan Jing (CN); Xiaoliang Jin, Nanjing (CN); Zhen Cui, Nan Jing (CN); Lei Li, Nan Jing (CN)

(73) Assignee: Nanjing University of Science and Technology, Nan Jing (CN)

( * ) Notice: Subject to any disclaimer, the term of this patent is extended or adjusted under 35 U.S.C. 154(b) by 0 days.

(21) Appl. No.: 18/988,134

(22) Filed: Dec. 19, 2024

(30) Foreign Application Priority Data

Jan. 29, 2024 (CN) .......................... 2024101157776

(51) Int. Cl.
  *H02M 1/00* (2007.01)
  *H02M 7/537* (2006.01)
(52) U.S. Cl.
  CPC ......... *H02M 1/0038* (2021.05); *H02M 7/537* (2013.01)
(58) Field of Classification Search
  None
  See application file for complete search history.

(56) References Cited

U.S. PATENT DOCUMENTS

2023/0068964 A1  3/2023  Liu et al.

FOREIGN PATENT DOCUMENTS

| CN | 103765757 A | 4/2014 |
|---|---|---|
| CN | 114268233 A | 4/2022 |

(Continued)

OTHER PUBLICATIONS

Zhang Xueguang et al.; Circulating Current Loop Bandwidth Expansion for Parallel Three-Phase PWM Converter Connection System; Harbin Institute of Technology, Harbin, 150001 China; Transactions of China Electrotechnical Society; vol. 30; No. 18; Sep. 2015; China Academic Journal Electronic Publishing House; (7 pages).

(Continued)

*Primary Examiner* — Ryan A Jarrett
(74) *Attorney, Agent, or Firm* — REISING ETHINGTON, P.C.

(57) ABSTRACT

A carrier reconstruction method to eliminate DC and low-frequency circulating currents in multi-parallel converters is disclosed, addressing the issue of DC and low-frequency circulating currents introduced by traditional carrier phase shift methods. By alternately setting complementary initial phase angles of carriers, this reconstruction method achieves balanced and symmetrical carriers within two periods, thereby eliminating the DC and low-frequency circulating currents caused by asymmetric carriers. The reconstructed carrier method provides a universal solution. It can solve all DC and low-frequency circulating currents issues based on traditional phase-shift carrier modulation strategies. Additionally, the carrier reconstruction method prevents core saturation in common mode inductors or coupled inductors, simplifying the design complexity of these inductors. This disclosure not only reduces inductor size and improves inductor efficiency but also enhances the overall performance of multi-parallel converters.

5 Claims, 26 Drawing Sheets

(56) References Cited

FOREIGN PATENT DOCUMENTS

CN 115208218 A 10/2022
WO WO-2017080388 A1 * 5/2017 .............. H02M 1/12

OTHER PUBLICATIONS

Notice of Allowance for Chinese Patent Application No. 202410115777.6; dated Jul. 1, 2024 (3 pages).

* cited by examiner

CARRIER RECONSTRUCTION METHOD FOR ELIMINATING DC AND LOW-FREQUENCY CIRCULATING CURRENTS IN MULTI-PARALLEL CONVERTERS

CROSS-REFERENCE TO RELATED APPLICATIONS

The disclosure is based upon and claims priority to Chinese Patent Application No. 202410115777.6, filed on Jan. 29, 2024, the entire contents of which are incorporated herein by reference.

TECHNICAL FIELD

The disclosure relates to a carrier modulation implementation method for circulating current optimization, in particular, relates to a carrier reconstruction method for eliminating DC and low-frequency circulating currents in multi-parallel converters.

BACKGROUND

With the increasing demand for high power in industrial settings, multi-parallel converters are widely used in various high-power applications, such as high-power motor drives, grid-connected wind power generation, and uninterruptible power supplies. The multi-parallel converter topology achieves volume and cost reduction by directly paralleling multiple two-level converters, effectively doubling the system capacity, making it an excellent current expansion topology.

Control architectures for multi-parallel converters are categorized mainly into two types: decentralized and centralized. In a decentralized architecture, along with its dedicated controller, forms an independent unit, and each unit operates autonomously. In a centralized architecture, all converters are centrally controlled by a single central controller to achieve carriers interleaving. By interleaving carriers, the centralized architecture effectively suppresses the output current harmonics of parallel converters and improves the quality of parallel output current, which has garnered significant attention.

However, the interleaving carriers introduce instantaneous switching states differences among multi-parallel converters per carrier period, leading to the generation of circulating currents. These circulating currents can be classified into two types: intra-phase circulating current and zero-sequence circulating current. The intra-phase circulating current flows among parallel legs with each phase, whereas the zero-sequence circulating current refers to the currents circulating the entire three-phase of each individual converter. Both types increase the loss in switching devices and reduce the overall system efficiency. Depending on the circulating current being suppressed, the filter inductances in multi-parallel converters are categorized into the coupled inductor and common mode inductor. The coupled inductor is designed to suppress the intra-phase circulating currents across the parallel legs within each phase. Conversely, the common mode inductor is employed to suppress zero-sequence circulating current across multi-parallel converters. Although the two types of inductors suppress different types of circulating currents, they remain the significant components in multi-parallel converters, affecting the overall size and output performance of the system.

Both intra-phase circulating current and zero-sequence circulating current are generated by instantaneous switching state differences, which exhibit high-frequency characteristics, often several times the switching frequency. Therefore, the coupled inductor and common mode inductor for suppressing these high-frequency currents typically use core materials such as ferrite, which have favorable magnetic properties at these frequencies. It is worth noting that high-frequency inductors are generally smaller, as the inductance required for effective impedance at high frequencies is lower. However, challenges arise when these high-frequency inductors encounter DC and low-frequency circulating current. The main concern is the potential core saturation, which reduces the inductor's efficiency in suppressing high-frequency currents and can cause significant thermal issues. To prevent saturation and achieve high inductance at low frequencies, a larger core is often necessary. Consequently, when DC and low-frequency circulating currents are present in a multi-parallel converter system, the required inductor becomes larger, more expensive, and less efficient. Therefore, it is crucial to eliminate DC and low-frequency circulating currents caused by asymmetric carriers.

SUMMARY

The disclosure provides a carrier reconstruction method for eliminating DC and low-frequency circulating currents in multi-parallel converters, addressing the problem of DC and low-frequency circulating currents based on traditional phase-shift carrier modulation strategies. Additionally, the carrier reconstruction method avoids core saturation in common mode inductors or coupled inductors, simplifying the design complexity of these inductors.

The disclosure provides a carrier reconstruction method for eliminating DC and low-frequency circulating currents in multi-parallel converters, wherein for n parallel converters, carrier balance and symmetry within two periods are achieved by alternately setting complementary initial phase angles of carriers, thereby eliminating the DC and low-frequency circulating currents introduced by traditional phase-shift carrier modulation methods. The carrier reconstruction provides a general solution that addresses all DC and low-frequency circulating currents issues based on traditional phase-shift carrier modulation strategies. Additionally, this carrier reconstruction method avoids core saturation in common mode inductors or coupled inductors, simplifying the design complexity of these inductors.

Selectively, the n parallel converters are set as follows: the carrier initial phase angle for the first converter is $\theta_1$, while taking the first converter as a reference, the carrier phase shift between every two adjacent converters is $2\pi/n$; taking the carrier of the first converter as the reference, the carrier phase shift for the second converter is $\Delta\theta_2 = 2\pi/n$, the carrier initial phase angle of the second converter is $\theta_2 = \theta_1 + 2\pi/n$; taking the carrier of the first converter as the reference, the carrier phase shift of the k-th converter is $\Delta\theta_k = 2\pi(k-1)/n$, the carrier initial phase angle of the k-th converter is $\theta_k = \theta_1 + 2\pi(k-1)/n$; taking the carrier of the first converter as the reference, the carrier phase shift of the n-th converter is $\Delta\theta_n = 2\pi(n-1)/n$, the carrier initial phase angle of the n-th converter is $\theta_n = \theta_1 + 2\pi(n-1)/n$.

Selectively, the carrier of the first converter is generally in a shape of an inverted triangular or a triangular, with $\theta_1 = 0°$ or $\pi$.

Further, when $\theta_1 = 0°$ or $\pi$, a k-th converter has a carrier initial phase angle $\theta_k$, and a corresponding p-th converter has a carrier initial phase angle $\theta_p$ that satisfies $\theta_p = 2\pi - \theta_k$.

Further, wherein the carrier reconstruction comprises: for the k-th converter, a two-switching-period repetition is adopted. In the first switching period, the carrier initial phase angle is $\theta_k$, and selecting carrier initial phase angle for the second switching period is $\theta_p$, alternating the carrier initial phase angle to achieve carrier balance and symmetry within two periods; for the p-th converter, a two-switching-period repetition is adopted. The carrier initial phase angle for the first switching period is $\theta_p$, and the carrier initial phase angle for the second switching period is $\theta_k$, alternating the initial phase angle to achieve carrier balance and symmetry within two periods.

Further, when three phases' carriers of the same parallel converter choose different initial phase angles, the carrier reconstruction method comprises: selecting carrier initial phase angles $x_k$, $y_k$, $z_k$ of the three phases a, b, c in sequence, a two-switching-period repetition is adopted. In the first switching period, the carrier initial phase angles of the three phases a, b, c are selected in sequence as $x_k$, $y_k$, $z_k$, in the second switching period, the initial phase angles of the three phases a, b, c are selected in sequence as $2\pi-x_k$, $2\pi-y_k$, $2\pi-z_k$.

Further, the number of parallel converters n can be a positive integer greater than 1. When n is even, the first converter and the (n/2+1)-th converter do not need carrier reconstruction, while the remaining n−2 converters need carrier reconstruction; and when n is odd, the first converter does not need carrier reconstruction, while the remaining n−1 converters need carrier reconstruction.

Further, existing modulation strategies include SPWM, SVPWM, ICPSPWM, DPWM, AZSPWM, and existing modulation strategies of multi-parallel converters.

The disclosure provides a computer-readable storage medium configured to store a computer program, wherein, the computer program is configured to implement the carrier reconstruction method for eliminating DC and low-frequency circulating currents in multi-parallel converters when executed by the processor.

Compared with the prior art, the disclosure has the following beneficial effects:

(1) The DC and low-frequency circulating currents are eliminated through software algorithms, ensuring the common mode inductors or coupled inductors design can focus on their original high-frequency characteristics; (2) the method not only makes the inductor design more cost-effective and space-efficient, but also improves the overall performance of multi-parallel converters; (3) the method is generally applicable to modulation strategies for multi-parallel converters, which can effectively eliminate DC and low-frequency circulating currents in any number of parallel converters.

DETAILED DESCRIPTION

The specific embodiments of the present application will be clearly and fully described in detail below in combination with the drawings. Obviously, the described embodiments are only part of the embodiments of the disclosure and not all of them. Based on the embodiments of the disclosure, all other embodiments obtained by those of ordinary skill in the art without creative efforts shall fall within the scope of protection of the disclosure.

For multi-parallel converters, the existing phase-shift carrier modulation strategies introduce DC and low-frequency circulating currents, both of which can generate core saturation, reduce the efficiency, and lead to severe thermal issues.

The hardware approach to suppress the above circulating currents requires a significant increase in the size of the inductor, which is not only expensive but also inefficient. Therefore, the disclosure provides a method of eliminating DC and low-frequency circulating currents through carrier reconstruction. The disclosure allows common mode inductors or coupled inductors to focus more on their original high-frequency characteristics, making the inductor design more cost-effective and space-efficient, and also improving the overall performance of multi-parallel converters.

Figure 1:
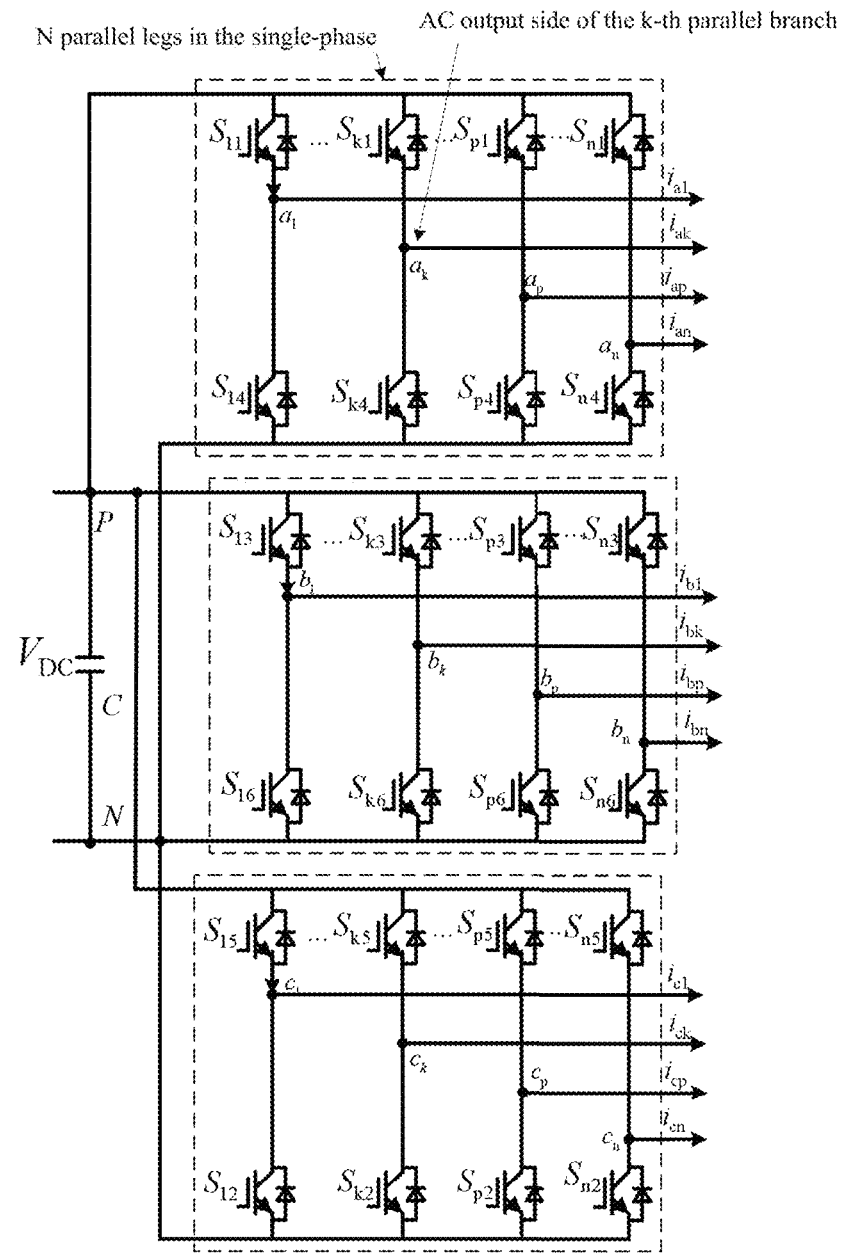
FIG. 1 is a topology diagram of multi-parallel converters.
Figure 2:
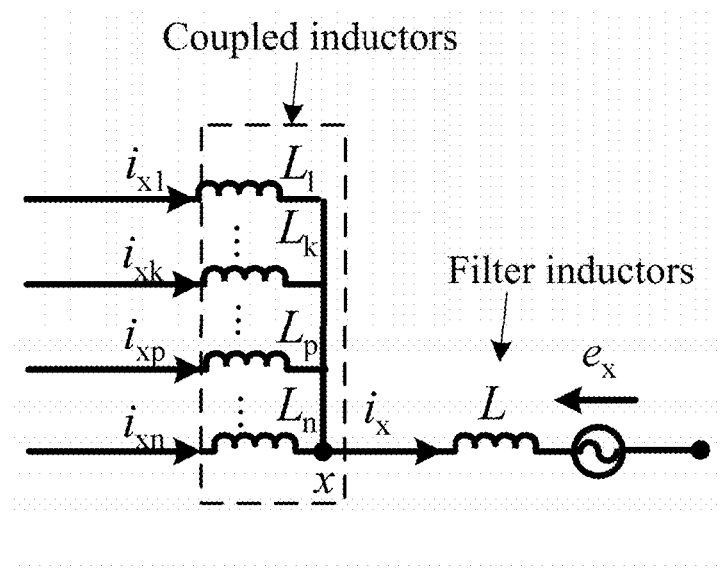
FIG. 2(a) is a diagram of the coupled inductors.
FIG. 2(b) is a diagram of the common mode inductors.
Figure 2:
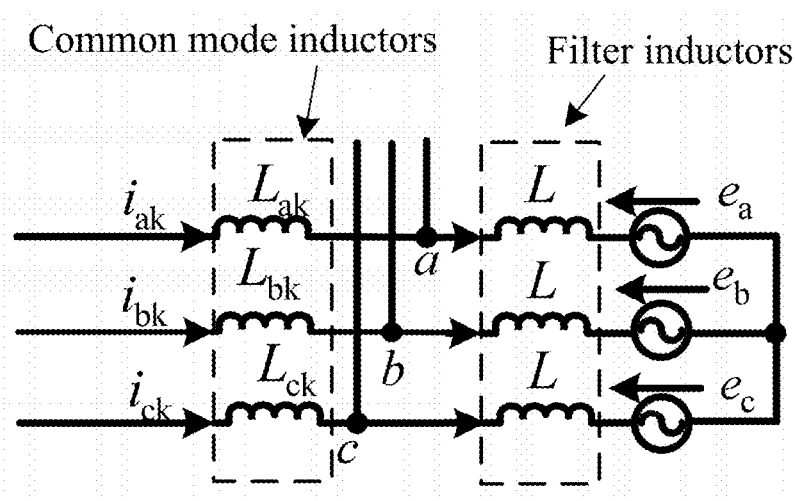

The topology diagram of multi-parallel converters is shown in FIG. 1. Where $i_{a1}$, $i_{b1}$ and $i_{c1}$ represent the three-phase currents of the first converter; $i_{ak}$, $i_{bk}$ and $i_{ck}$ represent the three-phase currents of the k-th converter; $i_{ap}$, $i_{bp}$ and $i_{cp}$ represent the three-phase currents of the p-th converter; $i_{an}$, $i_{bn}$ and $i_{cn}$ represent the three-phase currents of the n-th converter; and $V_{DC}$ represents the DC bus voltage, where 1<k<p<n, and n is the total number of converters. For multi-parallel converters, the coupled inductors or common mode inductors are used to suppress circulating currents, as shown in FIG. 2. FIG. 2(a) shows the topology of using the coupled inductors, where x represents three phases a, b, c; FIG. 2(b) shows the topology of using a common mode inductor.

Figure 3:
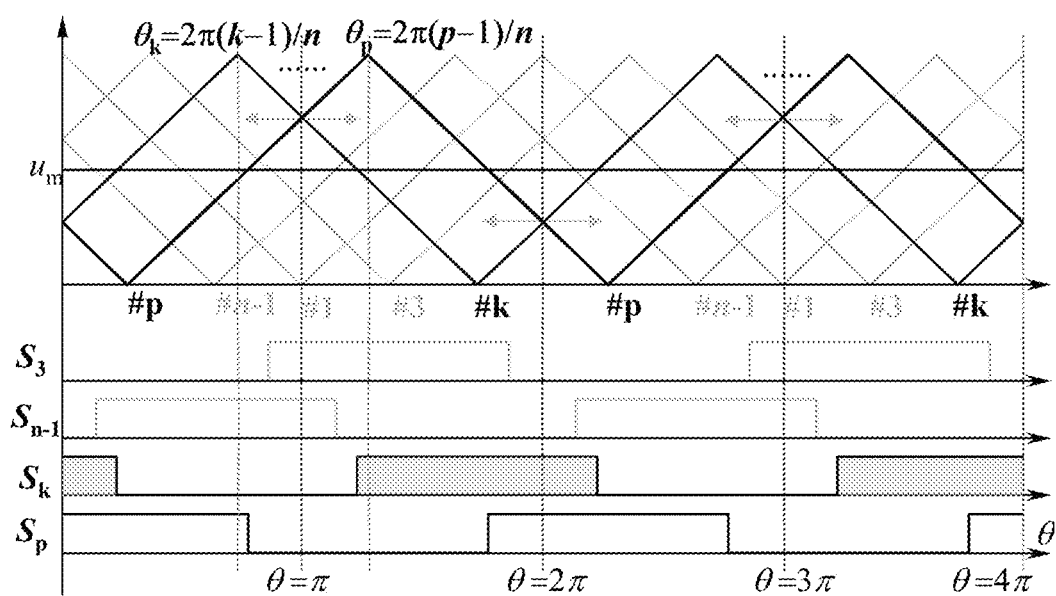
FIG. 3 is the carriers of n parallel converters.

For n parallel converters, when the same converter uses the same carrier, the phase-shift carrier modulation is shown in FIG. 3. The carrier initial phase angle of the first converter is 0°, the carrier initial phase angle of the k-th converter (k≤n/2) is $2\pi(k-1)/n$, the carrier initial phase angle of the p-th converter (p≥n/2) is $2\pi(p-1)/n$. According to FIG. 3, the carrier expression of the k-th converter is:

$$f_k(\theta) = \begin{cases} \frac{1}{\pi}\left(\theta - \frac{2(k-1)\pi}{n} + \pi\right), \theta \in \left[0, \frac{2(k-1)\pi}{n}\right] \\ -\frac{1}{\pi}\left(\theta - \frac{2(k-1)\pi}{n} + \pi\right), \theta \in \left[0, \frac{2(k-1)\pi}{n}, \frac{2(k-1)\pi}{n} + \pi\right] \\ \frac{1}{\pi}\left(\theta - \frac{2(k-1)\pi}{n} - \pi\right), \theta \in \left[\frac{2(k-1)\pi}{n} + \pi, 2\pi\right] \end{cases} \quad (1)$$

The carrier expression of the p-th converter is:

$$f_p(\theta) = \begin{cases} -\frac{1}{\pi}\left(\theta - \frac{2(p-1)\pi}{n} + \pi\right), \theta \in \left[0, \frac{2(p-1)\pi}{n} - \pi\right] \\ \frac{1}{\pi}\left(\theta - \frac{2(p-1)\pi}{n} + \pi\right), \theta \in \left[0, \frac{2(p-1)\pi}{n} - \pi, \frac{2(p-1)\pi}{n}\right] \\ -\frac{1}{\pi}\left(\theta - \frac{2(p-1)\pi}{n} - \pi\right), \theta \in \left[\frac{2(p-1)\pi}{n}, 2\pi\right] \end{cases} \quad (2)$$

When the carrier of the k-th converter is symmetric to the carrier of the p-th converter about $\pi$, the carrier satisfies the following equation:

$$f_k(\theta_k=\theta)=f_p(\theta_p=2\pi-\theta) \quad (3)$$

Therefore, the phase shift angle of the carriers of the symmetric converters satisfies the following equation:

$$\theta_k + \theta_p = \quad (4)$$
$$2\pi \Rightarrow \frac{2\pi(k-1)}{n} + \frac{2\pi(p-1)}{n} = 2\pi \Rightarrow k + p - 2 = n \Rightarrow p = n + 2 - k$$

According to the above equations, the carriers of the second and n-th converters are symmetric about $\pi$, and the carriers of the third and (n−1)-th converters are symmetric about $\pi$. Further analysis shows that the switching signals of the second and n-th converters are symmetric about $\pi$, and the switching signals of the third and (n−1)-th converters are symmetric about $\pi$.

For multi-parallel converters, the intra-phase circulating currents $i_{cirx-k}$ and the zero-sequence circulating current $i_{cir-k}$ of the k-th converter satisfy the following equations:

$$i_{cirx-k} = \frac{1}{n}\sum_{i=1}^{n} i_{cirx-k/i} \quad (5)$$

$$i_{cir-k}=i_{cira-k}+i_{cirb-k}+i_{circ-k} \quad (6)$$

In equations (5) and (6), x represents the three phases a, b, c, and $i_{cirx-k/i}$ represents the circulating current from phase x of the k-th converter to phase x of the i-th converter.

According to FIG. 3, the average circulating currents of the k-th converter and the p-th converter within the switching period always have a bias, as the switching signals of both converters are not symmetric about $T_s/2$. The magnitude of the bias is related to the magnitude and phase angle of the reference vector, but the polarity of the bias remains unchanged. Therefore, within the fundamental period, there must be DC and low-frequency circulating currents in the k-th converter and the p-th converter. Based on this, the disclosure provides a carrier reconstruction method to eliminate DC and low-frequency circulating currents. For converters with balanced circulating current, no carrier alternation is performed. For converters with circulating current bias, such as the k-th converter, a two-switching-period repetition is adopted. In the first switching period, the k-th carrier is used, and in the second switching period the (n+2−k)-th carrier is used. The method ensures that the carriers and switching signals of any converter are symmetric about $T_s$, keeping the average circulating current always at zero, effectively eliminating DC and low-frequency circulating currents.

Figure 4:
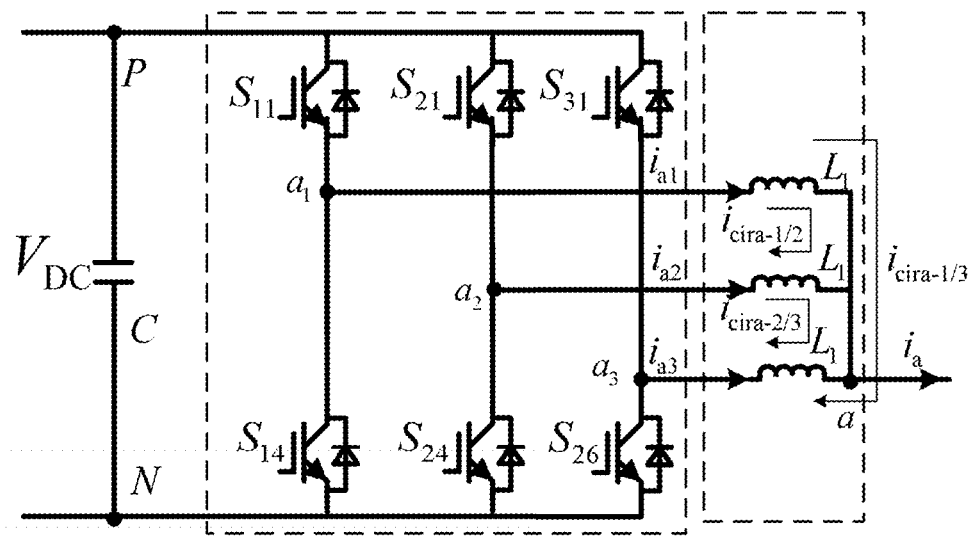
FIG. 4 is a schematic diagram of the circulating currents in three parallel converters.

Taking three parallel converters as an example, the schematic diagram of the circulating currents is shown in FIG. 4. In FIG. 4, coupled inductors or common mode inductors are represented by an equivalent inductance $L_1$. The circulating current between any two legs in phase a can be expressed as:

$$\begin{cases} L_1 \frac{di_{cira-1/2}}{dt} = u_{a1o} - u_{a2o} = (S_{a1} - S_{a2})V_{DC} \\ L_1 \frac{di_{cira-1/3}}{dt} = u_{a1o} - u_{a3o} = (S_{a1} - S_{a3})V_{DC} \\ L_1 \frac{di_{cira-2/3}}{dt} = u_{a2o} - u_{a3o} = (S_{a2} - S_{a3})V_{DC} \end{cases} \quad (7)$$

In Equation (7), $u_{a1o}$, $u_{a2o}$, and $u_{a3o}$ represent a-phase output voltages of the three converters respectively; $S_{a1}$, $S_{a2}$, and $S_{a3}$ represent the a-phase switching states of the three converters respectively.

Based on equation (7), the three circulating currents of phase a between different converters is obtained as:

$$\begin{cases} i_{cira-1/2} = \dfrac{S_{a1} - S_{a2}}{L_1} V_{DC} \Delta t \\ i_{cira-1/3} = \dfrac{S_{a1} - S_{a3}}{L_1} V_{DC} \Delta t \\ i_{cira-2/3} = \dfrac{S_{a2} - S_{a3}}{L_1} V_{DC} \Delta t \end{cases} \quad (8)$$

Further, substituting the equation (8) into equation (5), the equation for the intra-phase circulating currents is obtained as:

$$\begin{cases} i_{cira1} = \dfrac{(i_{cira-1/2} + i_{cira-1/3})}{3} = \dfrac{2S_{a1} - S_{a2} - S_{a3}}{3L_1} V_{DC} \Delta t = V_{cira1} \Delta t \\ i_{cira2} = \dfrac{(i_{cira-2/1} + i_{cira-2/3})}{3} = \dfrac{2S_{a2} - S_{a1} - S_{a3}}{3L_1} V_{DC} \Delta t = V_{cira2} \Delta t \\ i_{cira3} = \dfrac{(i_{cira-3/1} + i_{cira-3/2})}{3} = \dfrac{2S_{a3} - S_{a1} - S_{a2}}{3L_1} V_{DC} \Delta t = V_{cira3} \Delta t \end{cases} \quad (9)$$

Wherein, $V_{cira1}$, $V_{cira2}$ and $V_{cira3}$ represent the voltage differences.

Figure 5:
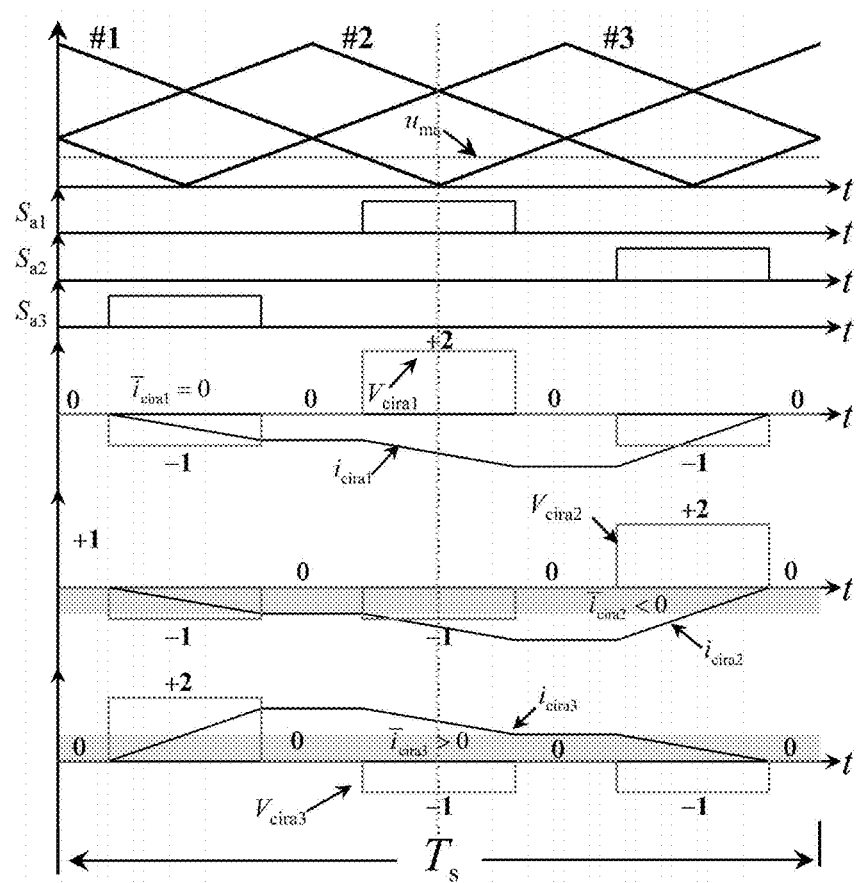
FIG. 5(a) shows the switching signals and the circulating currents within one switching period for three parallel converters when the duty cycle $0<d_a<1/3$.
FIG. 5(b) shows the switching signals and the circulating currents within one switching period for three parallel converters when the duty cycle $1/3<d_a<2/3$.
FIG. 5(c) shows the switching signals and the circulating currents within one switching period for three parallel converters when the duty cycle $2/3<d_a<1$.
Figure 5:
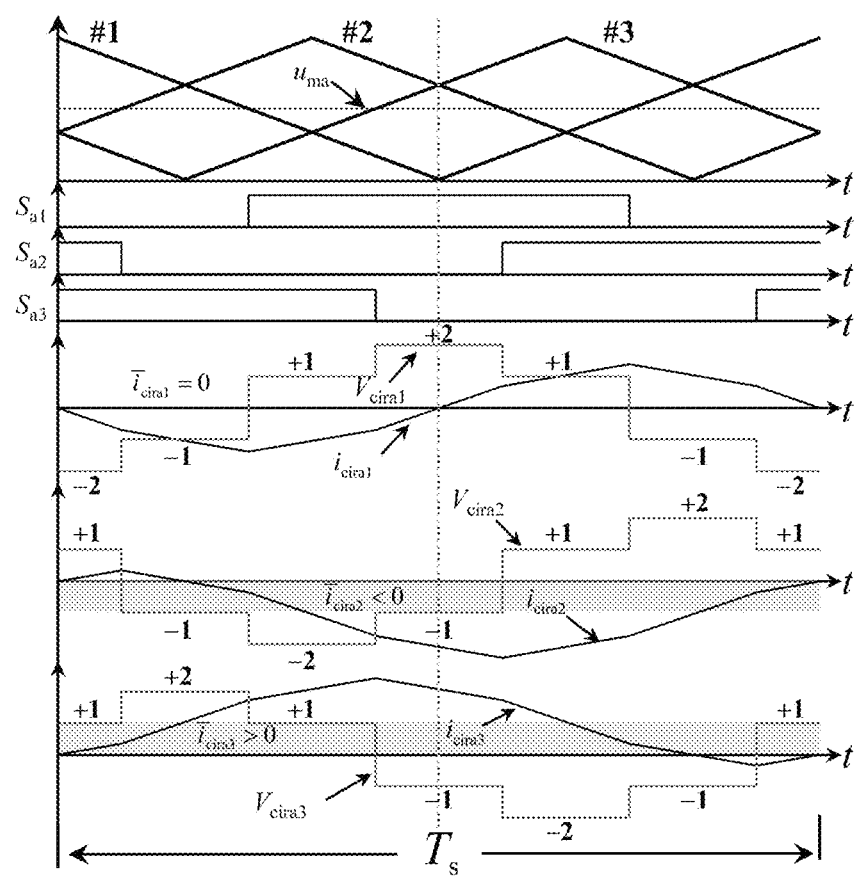
Figure 5:
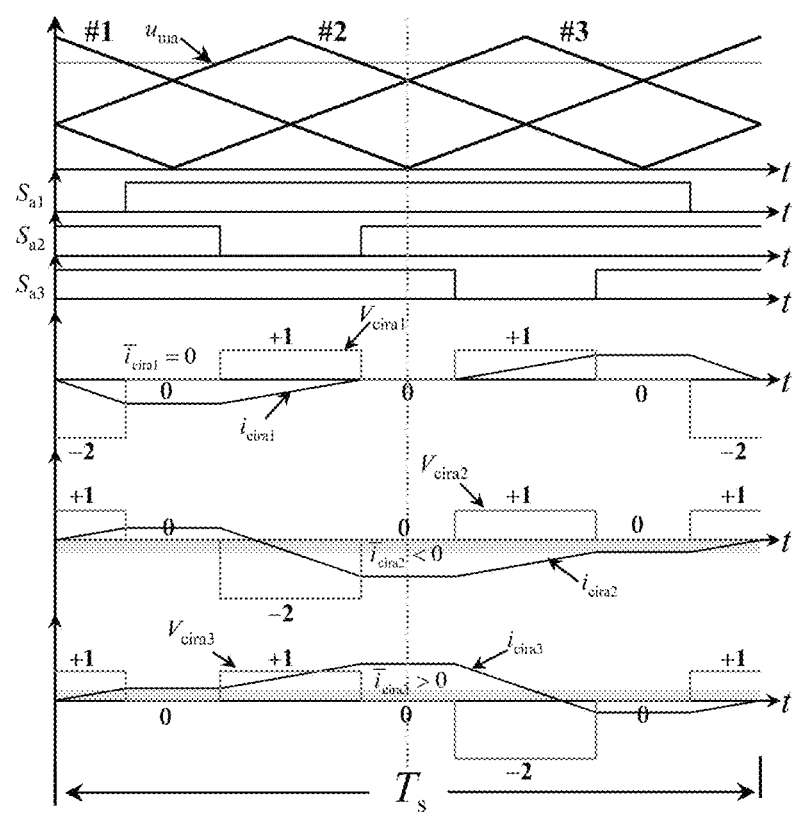

Taking phase a as an example, based on equation (9), the switching signals and circulating current waveforms of three different duty cycles are obtained in FIG. 5(a)-FIG. 5(c). FIG. 5(a) shows the switching signals and the circulating currents when the duty cycle $d_a \in (0, 1/3]$; FIG. 5(b) shows the switching signals and the circulating currents when the duty cycle $d_a \in (1/3, 2/3]$; FIG. 5(c) shows the switching signals and the circulating currents when the duty cycle $d_a \in (2/3, 1]$. As shown in FIG. 5, using the traditional phase-shift carrier modulation strategy, both the second and third converters exhibit a circulating current bias within the switching period, and the polarity of the bias remains unchanged. Extending this to three phases, the same carrier is used for the same converter, hence the polarity of the circulating current bias remains unchanged. The polarity of the zero-sequence circulating current is consistent with the polarity of the intra-phase circulating currents, and the bias of the zero-sequence circulating current is more severe than the bias of the intra-phase circulating currents. According to the above analysis, the circulating currents in multi-parallel converters using the traditional phase-shift carrier modulation strategy inevitably contain DC and low-frequency components.

Figure 6:
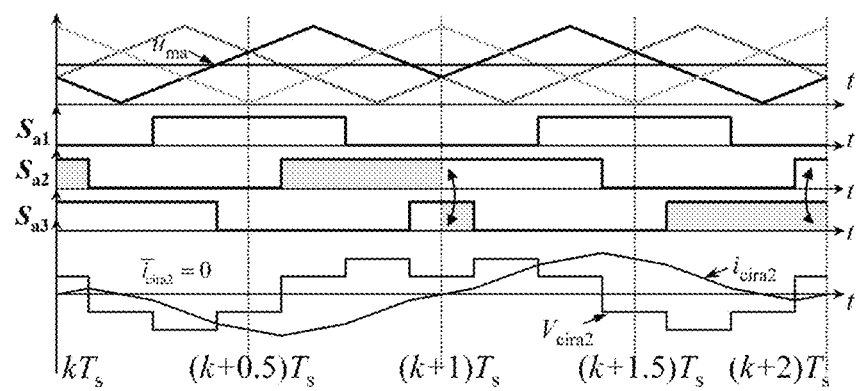
FIG. 6 shows the switching signals and the circulating currents within two switching periods of three parallel converters using the method provided by the disclosure when the duty cycle $1/3<d_a<2/3$.
Figure 7:
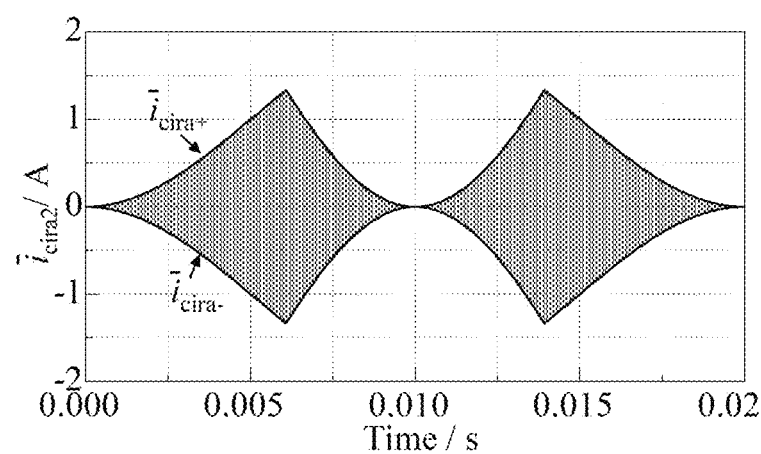
FIG. 7(a) shows the average a-phase circulating current of the second converter in three parallel converters using the method provided by the disclosure with the modulation index of 1.0.
FIG. 7(b) shows the a-phase circulating current spectrum of the second converter in three parallel converters using the method provided by the disclosure with the modulation index of 1.0.
Figure 7:
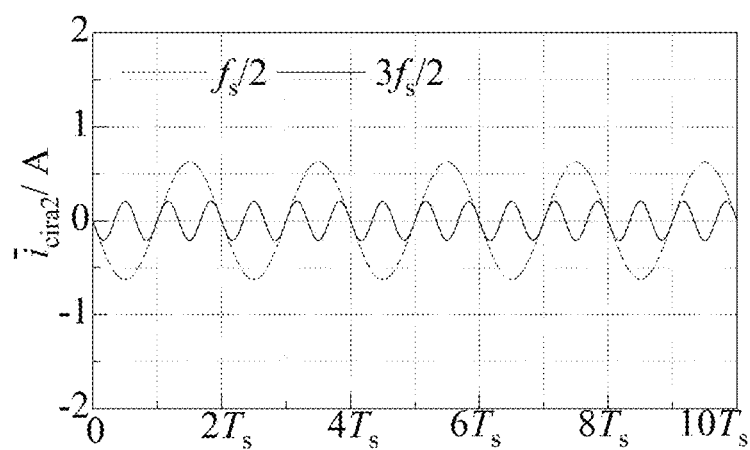
Figure 8:
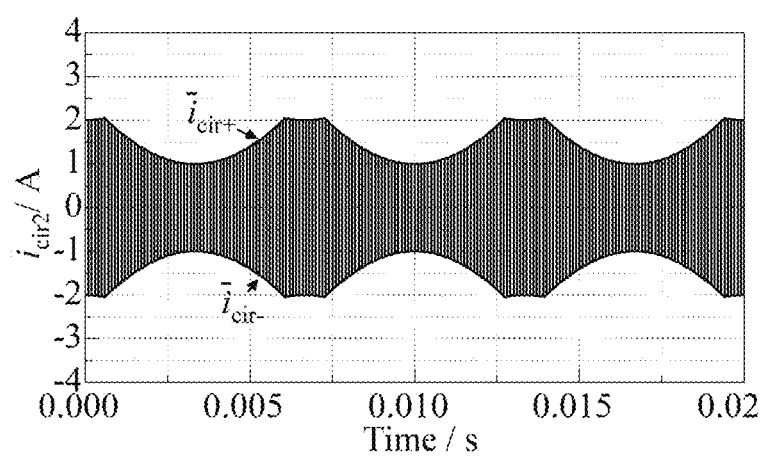
FIG. 8(a) shows the zero-sequence circulating current of the second converter in three parallel converters using the method provided by the disclosure with the modulation index of 1.0.
FIG. 8(b) shows the zero-sequence circulating current spectrum of the second converter in three parallel converters using the method provided by the disclosure with the modulation index of 1.0.
Figure 8:
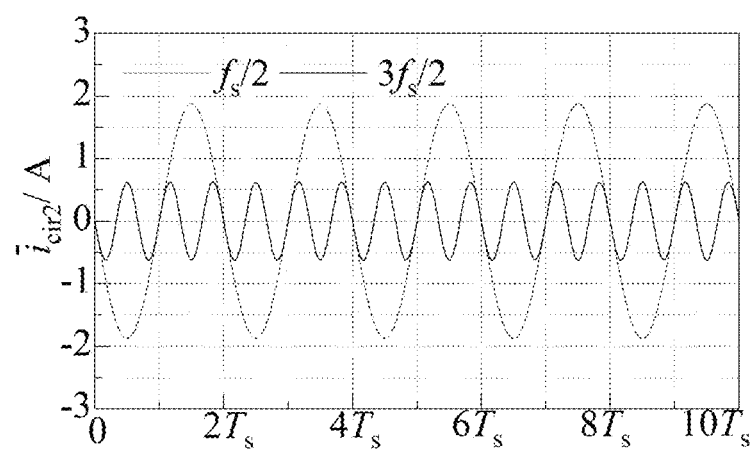

To suppress the above DC and low-frequency circulating currents, the disclosure provides a carrier reconstruction method. Taking three parallel converters as an example: for the first converter, which has balanced circulating currents, no changes are made; for the second converter, where a circulating current bias exists, a two-switching-period repetition is adopted, the second carrier is used in the first period while the third carrier is used in the second period; for the third converter, where a circulating current bias exists, a two-switching-period repetition period is adopted. In the first switching period, the third carrier is used, and in the second switching period, the second carrier is used. Taking $d_a \in (1/3, 2/3]$ as an example, the waveform diagram of the reconstructed carriers, the switching signals and the circulating currents are shown in FIG. 6. According to FIG. 6, the average value of the circulating currents within two switching periods is zero, and the circulating currents do not contain any DC or low-frequency components. Extending this to 360°, the a-phase circulating current is shown in FIG. 7(a) and FIG. 7(b). The circulating current envelope $i_{cira-}$ in FIG. 7(a) represents the average a-phase circulating current when only the second carrier is used, and the circulating current envelope $i_{cira+}$ in FIG. 7(a) represents the average a-phase circulating current when only the third carrier is used. By analyzing the waveform of the a-phase circulating current in FIG. 7(a), the a-phase spectrum is obtained, as shown in FIG. 7(b). According to FIG. 7(b), the a-phase circulating current is mainly concentrated around 0.5 and 1.5 times the switching frequency, with no DC or low-frequency components. Furthermore, the zero-sequence circulating current of the second converter is shown in FIG. 8(a) and FIG. 8(b). The circulating current envelope $i_{cir-}$ in FIG. 8(a) represents the average value of the zero-sequence circulating current when only the second carrier is used, and the circulating current envelope $i_{cir+}$ in FIG. 8(a) represents the average value of the zero-sequence circulating current when only the third carrier is used. By analyzing the waveform of the zero-sequence circulating current in FIG. 8(a), the spectrum of the zero-sequence circulating current is obtained, as shown in FIG. 8(b). According to FIG. 8(b), the zero-sequence circulating current is mainly concentrated around 0.5 and 1.5 times the switching frequency, with no DC or low-frequency components. This result demonstrates that the disclosure effectively suppresses low-frequency circulating currents.

Figure 9:
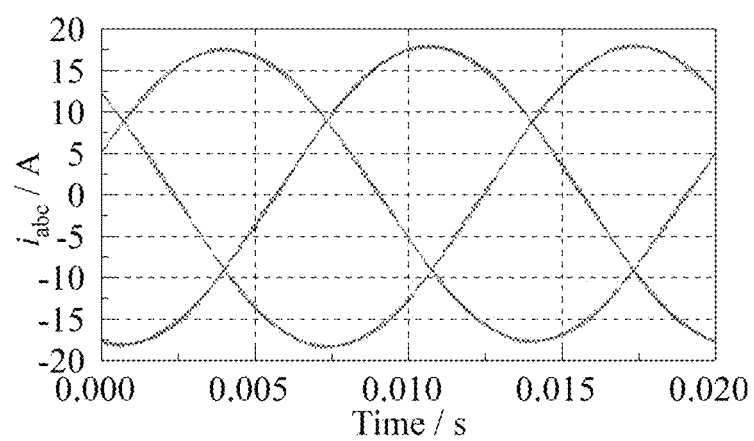
FIG. 9 shows the line current of three parallel converters using the method provided by the disclosure.
Figure 10:
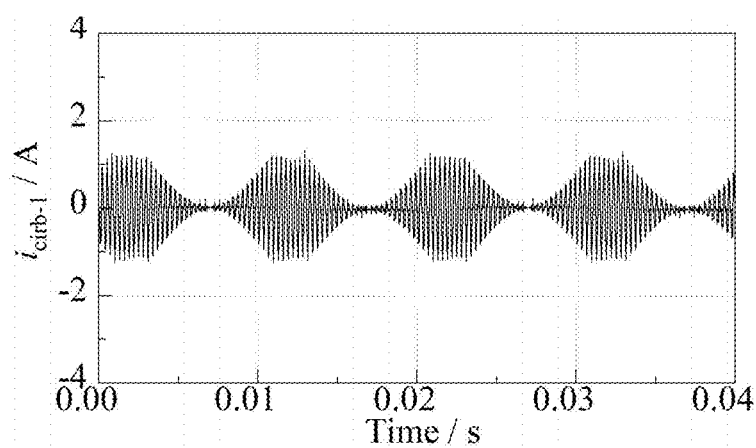
FIG. 10(a) shows the b-phase circulating current of the first converter in three parallel converters using the method provided by the disclosure.
FIG. 10(b) shows the b-phase circulating current spectrum of the first converter in three parallel converters using the method provided by the disclosure.
Figure 10:
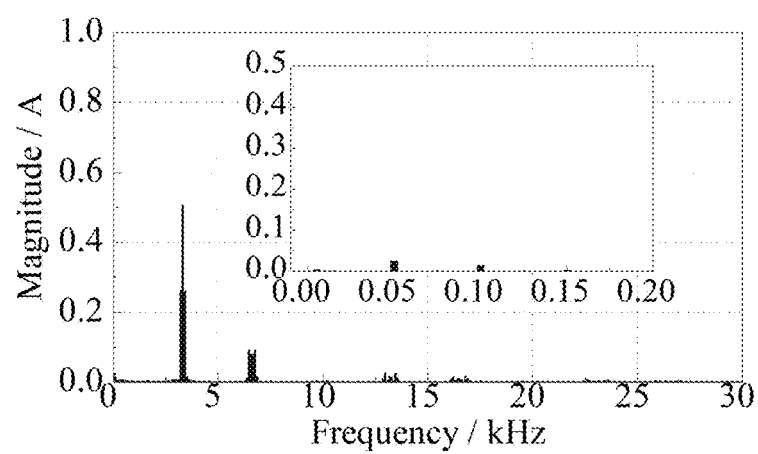
Figure 11:
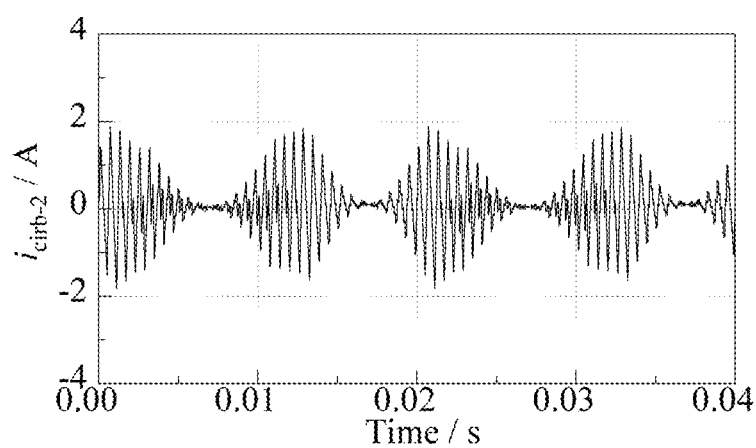
FIG. 11(a) shows the b-phase circulating current of the second converter in three parallel converters using the method provided by the disclosure.
FIG. 11(b) shows the b-phase circulating current spectrum of the second converter in three parallel converters using the method provided by the disclosure.
Figure 11:
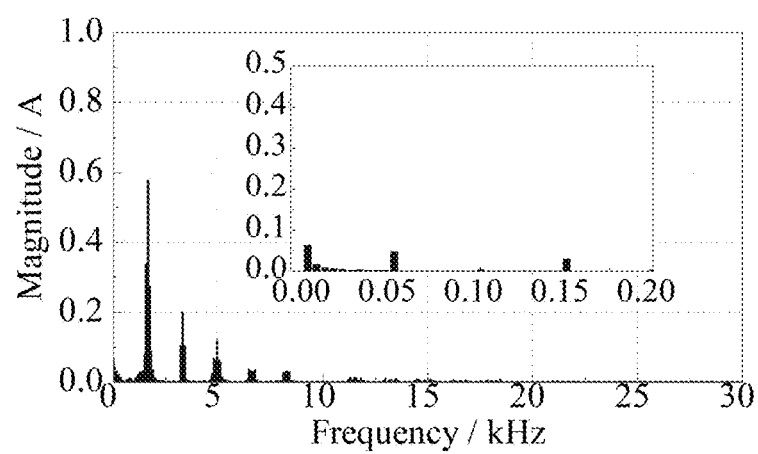
Figure 12:
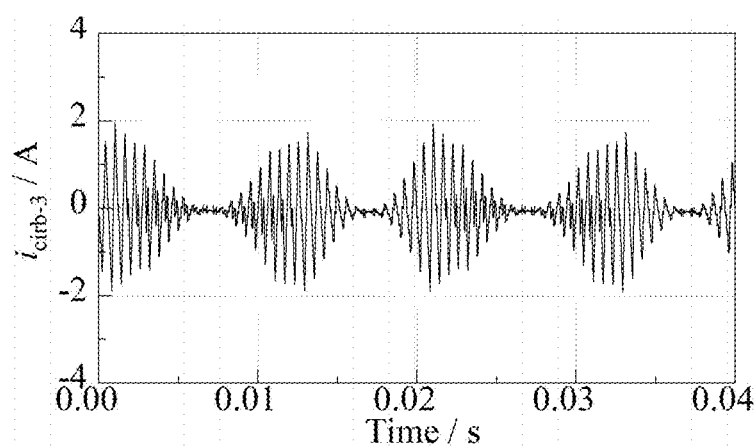
FIG. 12(a) shows the b-phase circulating current of the third converter in three parallel converters using the method provided by the disclosure.
FIG. 12(b) shows the b-phase circulating current spectrum of the third converter in three parallel converters using the method provided by the disclosure.
Figure 12:
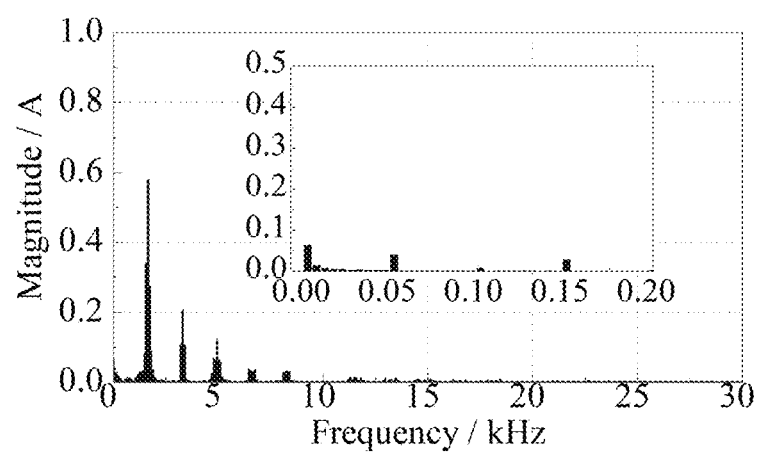
Figure 13:
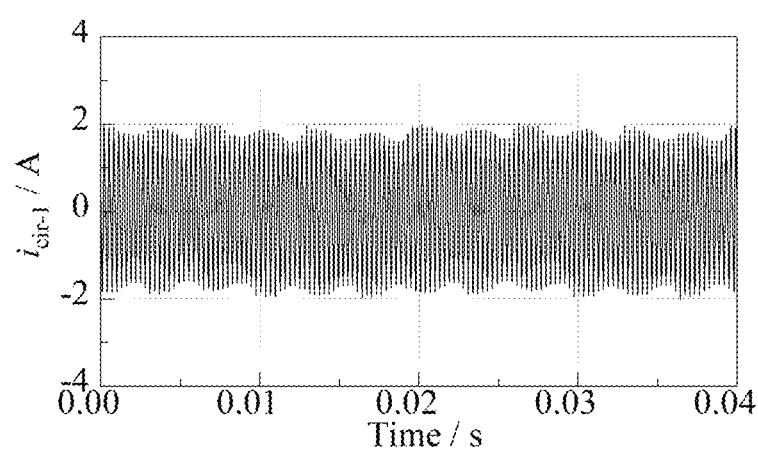
FIG. 13(a) shows the zero-sequence circulating current of the first converter in three parallel converters using the method provided by the disclosure.
FIG. 13(b) shows the zero-sequence circulating current spectrum of the first converter in three parallel converters using the method provided by the disclosure.
Figure 13:
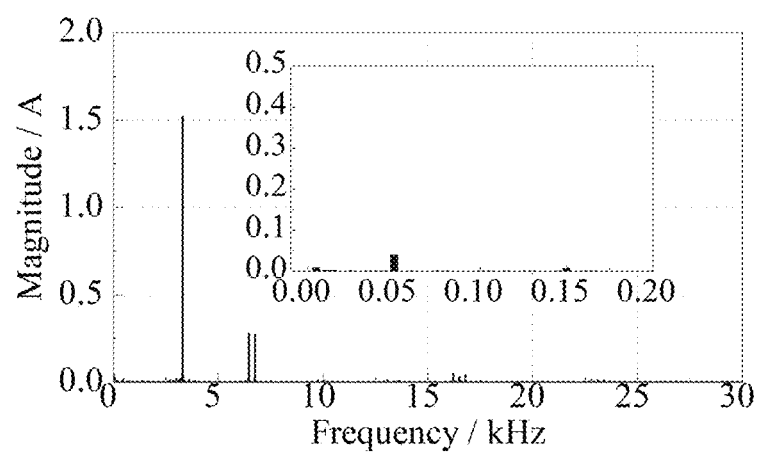
Figure 14:
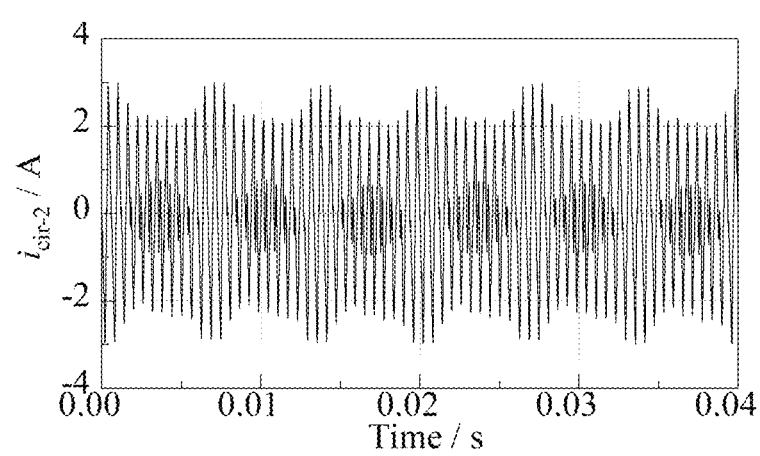
FIG. 14(a) shows the zero-sequence circulating current of the second converter in three parallel converters using the method provided by the disclosure.
FIG. 14(b) shows the zero-sequence circulating current spectrum of the second converter in three parallel converters using the method provided by the disclosure.
Figure 14:
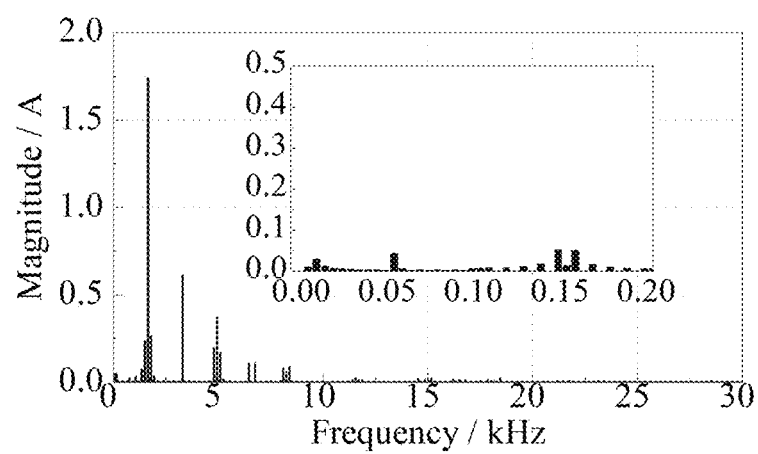
Figure 15:
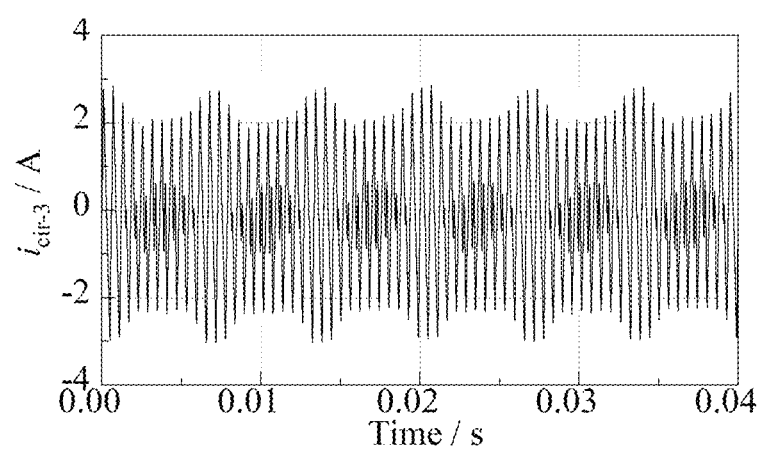
FIG. 15(a) shows the zero-sequence circulating current of the third converter in three parallel converters using the method provided by the disclosure.
FIG. 15(b) shows the zero-sequence circulating current spectrum of the third converter in three parallel converters using the method provided by the disclosure.
Figure 15:
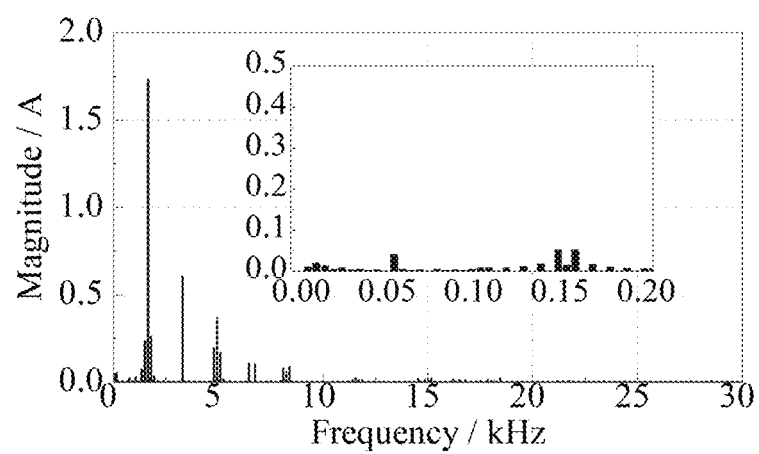

Further experimental verification was conducted under the following conditions: a DC bus voltage of 400V, a switching frequency of 3.3 kHz, a load resistance of 10Ω, and a converter filter inductance of 10 mH. FIG. 9 to FIG. 15 show the experimental results of the carrier reconstruction method proposed in the disclosure under a modulation index of 1.0. FIG. 9 shows the line current of three parallel converters. FIG. 10(a) shows the b-phase circulating current of the first converter in three parallel converters; FIG. 10(b) shows the b-phase circulating current spectrum of the first converter in three parallel converters. FIG. 11(a) shows the b-phase circulating current of the second converter in three parallel converters; FIG. 11(b) shows the b-phase circulating current spectrum of the second converter in three parallel converters. FIG. 12(a) shows the b-phase circulating current of the third converter in three parallel converters; FIG. 12(b) shows the b-phase circulating current spectrum of the third converter in three parallel converters. FIG. 13(a) shows the zero-sequence circulating current of the first converter in three parallel converters; FIG. 13(b) shows the zero-sequence circulating current spectrum of the first converter in three parallel converters. FIG. 14(a) shows the zero-sequence circulating current of the second converter in three parallel converters; FIG. 14(b) the zero-sequence circulating current spectrum of the second converter in three parallel converters.

What is claimed is:

1. A carrier reconstruction method for eliminating DC and low-frequency circulating currents in multi-parallel converters, wherein for n parallel converters, the carrier reconstruction is performed by alternately setting complementary initial phase angles of carriers to achieve carrier balance and symmetry within two periods;

wherein the carrier initial phase angles for the n parallel converters are set as follows:
a carrier initial phase angle for a first converter is $\theta_1$, while taking the first converter as a reference, a carrier phase shift between every two adjacent converters is $2\pi/n$;

taking a carrier of the first converter as the reference, a carrier phase shift of a second converter is $\Delta\theta_2=2\pi/n$, a carrier initial phase angle of the second converter is $\theta_2=\theta_1+2\pi/n$;

taking the carrier of the first converter as the reference, a carrier phase shift of a k-th converter is $\Delta\theta_k=2\pi(k-1)/n$, a carrier initial phase angle of the k-th converter is $\theta_k=\theta_1+2\pi(k-1)/n$;

taking the carrier of the first converter as the reference, a carrier phase shift of an n-th converter is $\Delta\theta_n=2\pi(n-1)/n$, a carrier initial phase angle of the n-th converter is $\theta_n=\theta_1+2\pi(n-1)/n$;

when $\theta_1=0°$ or $\pi$, the k-th converter has the carrier initial phase angle $\theta_k$, and a corresponding p-th converter has a carrier initial phase angle $\theta_p$ that satisfies $\theta_p=2\pi-\theta_k$;

wherein n is a positive integer greater than 1, and when n is even, the first converter and a (n/2+1)-th converter do not need carrier reconstruction, while the remaining n−2 converters need carrier reconstruction; and when n is odd, the first converter does not need carrier reconstruction, while the remaining n−1 converters need carrier reconstruction;

wherein the carrier reconstruction comprises: when the carrier initial phase angle of the k-th converter and the carrier initial phase angle of the p-th converter satisfy $\theta_p+\theta_k=2\pi$:

for the k-th converter, with two-switching-period repetition adopted, wherein the carrier initial phase angle for a first switching period is $\theta_k$, and selecting carrier initial phase angle for a second switching period is $\theta_p$, setting the carrier initial phase angles alternately to achieve carrier balance and symmetry within two periods;

for the p-th converter, with two-switching-period repetition adopted, wherein the carrier initial phase angle for the first switching period is $\theta_p$, and the carrier initial phase angle for the second switching period is $\theta_k$, setting the carrier initial phase angles alternately to achieve carrier balance and symmetry within two periods.

2. The carrier reconstruction method for eliminating DC and low-frequency circulating currents in multi-parallel converters according to claim 1, wherein, the carrier of the first converter is in a shape of an inverted triangular or a triangular, with $\theta_1=0°$ or $\pi$.

3. The carrier reconstruction method for eliminating DC and low-frequency circulating currents in multi-parallel converters according to claim 1, wherein, when three phases' carriers of the same parallel converter choose different initial phase angles, the carrier reconstruction method comprises:

selecting carrier initial phase angles $x_k$, $y_k$, $z_k$ of the three phases a, b, c in sequence, wherein with two-switching-period repetition adopted, in the first switching period, the carrier initial phase angles of the three phases a, b, c are selected in sequence as $x_k$, $y_k$, $z_k$;

in the second switching period, the initial phase angles of the three phases a, b, c are selected in sequence as $2\pi-x_k$, $2\pi-y_k$, $2\pi-z_k$.

4. The carrier reconstruction method for eliminating DC and low-frequency circulating currents in multi-parallel converters according to claim 3, wherein, existing modulation strategies include SPWM, SVPWM, ICPSPWM, DPWM, AZSPWM, and existing modulation strategies of multi-parallel converters.

5. A non-transitory computer-readable storage medium configured to store a computer program, wherein, the computer program is configured to implement the carrier reconstruction method for eliminating DC and low-frequency circulating currents in multi-parallel converters according to claim 1 when executed by the processor.

* * * * *